US012559431B2

(12) United States Patent
Lally

(10) Patent No.: US 12,559,431 B2
(45) Date of Patent: Feb. 24, 2026

(54) HIGH TEMPERATURE REFRACTORY, METHOD FOR MAKING HIGH TEMPERATURE REFRACTORY

(71) Applicant: Thomas J Lally, Naples, FL (US)

(72) Inventor: Thomas J Lally, Naples, FL (US)

( * ) Notice: Subject to any disclaimer, the term of this patent is extended or adjusted under 35 U.S.C. 154(b) by 0 days.

(21) Appl. No.: 19/067,516

(22) Filed: Feb. 28, 2025

(65) Prior Publication Data

US 2025/0296888 A1      Sep. 25, 2025

Related U.S. Application Data

(60) Provisional application No. 63/568,356, filed on Mar. 21, 2024.

(51) Int. Cl.
| | |
|---|---|
| *C04B 35/10* | (2006.01) |
| *C04B 35/63* | (2006.01) |
| *C04B 38/00* | (2006.01) |

(52) U.S. Cl.
CPC .......... *C04B 35/6313* (2013.01); *C04B 35/10* (2013.01); *C04B 38/0054* (2013.01); *C04B 2235/3206* (2013.01); *C04B 2235/3217* (2013.01); *C04B 2235/3272* (2013.01); *C04B 2235/3284* (2013.01); *C04B 2235/447* (2013.01)

(58) Field of Classification Search
CPC ................ C04B 35/6313; C04B 35/10; C04B 2235/3206; C04B 2235/3217; C04B 2235/447
See application file for complete search history.

(56) References Cited

U.S. PATENT DOCUMENTS

| | | | |
|---|---|---|---|
| 6,458,423 B1 | 10/2002 | Goodson | |
| 6,783,799 B1 * | 8/2004 | Goodson ............... | C04B 41/009 |
| | | | 427/403 |
| 6,787,495 B2 | 9/2004 | Lally | |
| 7,045,476 B1 * | 5/2006 | Lally .................... | C04B 28/348 |
| | | | 501/111 |
| 7,429,290 B2 | 9/2008 | Lally | |
| 7,491,267 B2 | 2/2009 | Francis et al. | |
| 7,939,458 B2 | 5/2011 | Nakamura et al. | |
| 8,268,062 B2 | 9/2012 | Lally | |
| 8,440,108 B2 | 5/2013 | Hamilton | |
| 8,523,997 B2 | 9/2013 | Valentini et al. | |

(Continued)

FOREIGN PATENT DOCUMENTS

| | | | |
|---|---|---|---|
| CN | 115650680 A * | 1/2023 | |
| WO | WO2010/096827 | 8/2010 | |
| WO | WO20096827 | 11/2010 | |

OTHER PUBLICATIONS

CN115650680A machine translation (Year: 2023).*

(Continued)

*Primary Examiner* — Cameron K Miller
(74) *Attorney, Agent, or Firm* — CHERSKOV FLAYNIK & GURDA LLC

(57) ABSTRACT

The invention provides a refractory containing monopotassium phosphate, magnesium oxide, alumina, and water. Also provided is a method for making a variable utility refractory, including combining MKP with a metal oxide and alumina to create a dry mixture, adding polar fluid to the dry mixture to create a slurry, and applying the slurry to a substrate to protect the substrate from thermal cycling at temperatures between 1300 to 1600° C.

8 Claims, 1 Drawing Sheet

(56) References Cited

U.S. PATENT DOCUMENTS

| | | |
|---|---|---|
| 8,603,231 B2 | 12/2013 | Wagh et al. |
| 8,663,382 B2 | 3/2014 | Dubey |
| 8,858,702 B2 | 10/2014 | Wagh et al. |
| 10,981,214 B2 | 4/2021 | Shaw |
| 2019/0176218 A1* | 6/2019 | Shaw ...................... B22C 1/181 |

OTHER PUBLICATIONS

Industrial Minerals of the United States—Wollastonite—A Versatile Industrial Mineral, USGS Science for a Changing World, U.S. Department of Interior, U.S. Geological Survey, USGS Fact Sheet Fs-002-01, Feb. 2001, 2 pages.

\* cited by examiner

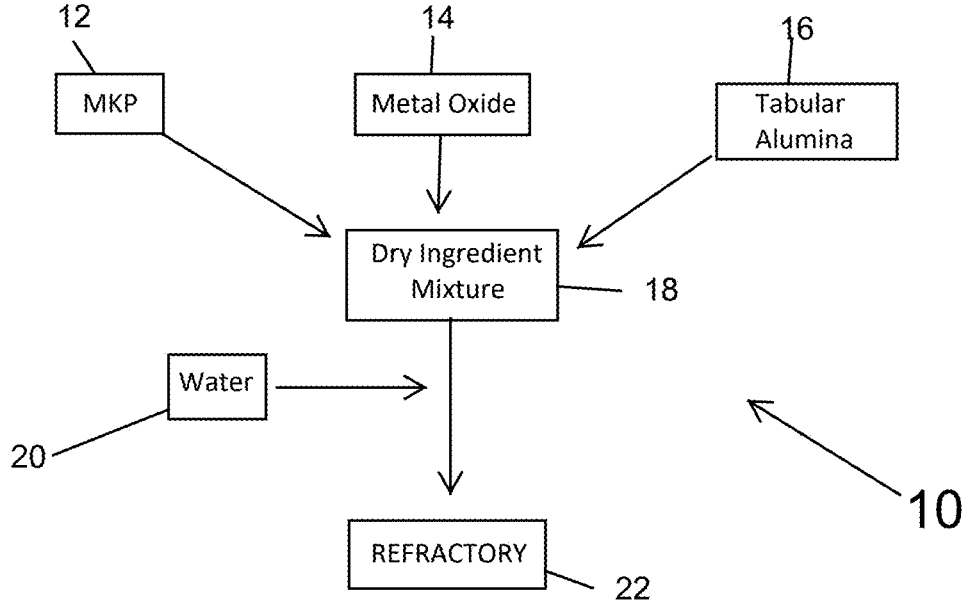

HIGH TEMPERATURE REFRACTORY, METHOD FOR MAKING HIGH TEMPERATURE REFRACTORY

PRIORITY

This Utility Patent Application claims the benefit of U.S. Provisional Patent Application No. 63/568,356 filed on Mar. 21, 2024, the entirety of which is incorporated herein by reference.

BACKGROUND OF THE INVENTION

1. Field of the Invention

This invention relates to refractories and more specifically, this invention relates to a refractory formulation to enable a wide application in high-temperature environments.

2. Background of the Invention

Structural components are susceptible to weakening in catastrophic situations, such as fires, explosions, and unforeseen corrosion conditions.

Refractory materials are often employed to protect these structural members. Indeed, the Applicant's technology (U.S. Pat. No. 7,045,476) is so utilized.

However, the state of the art, including the '476 patent, contains calcium in its mixture. Other calcium containing refractories are described in U.S. Pat. Nos. 7,045,476 B1, 8,663,382 B2, and 8,523,997 B2. Calcium is a common, relatively inexpensive constituent. However, the use of calcium as a primary constituent has its drawbacks, including significantly reducing the mechanical strength of the resultant refractory.

A need exists in the art for a refractory formulation that withstands multiple thermal cyclings. The formulation should be devoid of calcium and other similar metals which undergo thermal expansion relative to the underlayment of which the refractory is protecting.

SUMMARY OF INVENTION

An object of the invention is to provide a refractory formulation that overcomes many of the drawbacks of the prior art.

Another object of the invention is to provide a refractory that confers enhanced protection to underlayment. A feature of the invention is that the protection does not diminish despite repeated thermal cycles at temperatures exceeding 3700° C. An advantage of the invention is a reduction in costs related to refractory installation, repair, and replacement.

Still another object of the invention is to provide a refractory system that contains a novel mixture of metals and non-metals. A feature of the invention is that it contains no added calcium. (Calcium may be present in trace amounts, given the characteristics of formulation environments and constituencies of bulk feedstock items. Generally no more than between 0.5 and 5 percent calcium by weight, and typically no more than 1 percent would be present.) An advantage of the invention is that it presents an extended life of at least 35 percent longer than state of the art refractory systems containing calcium.

Yet another object of the present invention is to provide a refractory system that imparts robust thermal and physical tolerances. A feature of the system is that it supplants calcium typically found in state of the art refractories) with alumina. An advantage of the system is that the alumina imparts superior tensile and bending resistance, and faster setting times.

Briefly, the invention provides a refractory comprising: Monopotassium phosphate (MKP) ranging from 35 to 65 weight percent; Magnesium oxide ranging from 30 to 50 percent; Alumina ranging from 10 to 25 weight percent; and water ranging from 10 to 25 weight percent.

Also provided is a method for making a variable utility refractory, the method comprising combining MKP with magnesium oxide and alumina to create a dry mixture, adding polar fluid (such as water, alcohol, carboxylic acids, and combinations thereof) to the dry mixture to create a slurry; and applying the slurry to a substrate to protect the substrate from thermal cycling. Suitable substrates include, but are not limited to metal (such as steel, aluminum, copper), metal alloy, wood, plastic, glass, composites such as polymer, ceramic, cement, and combinations thereof.

A myriad of metal oxides may be used in the invented formulation, selected from the group consisting of magnesium oxide, iron oxide, zirconium oxide and combinations thereof. Preferably, magnesium oxide is utilized, given its controlled reactivity compared to other oxides. MgO hydrates slower and to a lesser extent compared to other oxides, especially under ambient conditions. This makes formulations containing MgO more stable and therefor more suitable in high-temperature applications.

BRIEF DESCRIPTION OF DRAWING

The invention together with the above and other objects and advantages will be best understood from the following detailed description of the preferred embodiment of the invention shown in the accompanying drawings, wherein:

FIG. 1 is a flow chart depicting formulation steps of a refractory, in accordance with features of the present invention.

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a high utility refractory. The refractory provides flexible protection to underlying substrates (such as steel, glass, wood, and plastic) to temperatures of at least up to 1300° C. (Protection is conferred to as high as 1600° C., for example when the underlying substrate is porous, wherein pore diameter up to several tens microns (e.g., 10-40 microns) and porosity is up to several tens percent (e.g., 1-30 percent, and preferably 5-25 percent). Exemplary porous materials are metals such as galvanized steel, stainless steel, titanium, and nickel, and nonmetallic materials.)

The invented refractory formulation is novel in its incorporation of nano-sheet aggregates such as tabular metal oxides (e.g., tabular alumina), phosphates and combinations thereof. This confers faster setting times, and fire proofing characteristics particularly valuable for car batteries and fuel cells.

Preferably, tabular alumina and not calcined alumina is incorporated in the preferred formulation. Tabular alumina is a high density, high strength form of $\alpha\text{-}Al_2O_3$ made by sintering an agglomerated shape of ground, calcined alumina. It is available in the form of smooth balls which are crushed, screened, and ground to obtain a wide variety of graded, granular, and powdered products.

Specifically, tabular alumina is aluminum oxide that has been heated to temperatures above 1,650° C. (3,000° F.). Composed of tablet-like crystals, it has high heat capacity and thermal conductivity as well as exceptional strength and volume stability at high temperatures. The key advantage of using tabular alumina in this refractory is that is provides thermal, mechanical and chemical stability; resistance to thermal shock and high abrasion resistance without the potential issues with other types of aluminum, including overcoming variations in aggregates. Tabular alumina interacts with, and at least partially fills the aforementioned pores of the various semi permeable underlayments discussed supra.

Suitable tabular alumina is available commercially, for example from Great Lakes Minerals, LLC (Wurtland, KY).

Exemplary additives include, but are not limited to mullite, sand, clay, volcanic glasses, kyanite, bauxite, aluminum oxide, silicon oxide, chrome oxide, iron oxide and combinations thereof. Such supplementary materials are preferably non-toxic and fire and/or flame resistant.

An exemplary formulation comprises the following substances:

Fly ash type C
torpedo sand #2
silica flour #325
silica sand #40-70
silica flour min-u-sil #30
sodium phosphate
Aluminum phosphate
MKP low activity
Sugar
Sodium bicarbonate FIG. 1 is a flow chart depicting a method for producing the invented refractory, the method generally designated as numeral 10. A first step comprises the establishment of a dry ingredient mixture 18, comprising MKP 12, a metal oxide 14 (such as calcined MgO, 325 powder) and tabular alumina 16 (e.g. 325 powder). The aforementioned dry constituents may first be milled, grounded, or otherwise comminuted prior to mixing, this to facilitate homogeneous mixing prior to the establishment of a slurry. Milling may be done at lower temperatures (e.g., less than ambient, i.e., between 0 C and 10 C), but at least above the freezing point of water, to minimize heating, and therefore oxidation, of the resulting powder. Milling in controlled environments (i.e., nitrogen, helium, or argon atmospheres) may also minimize oxidation. Generally, milling may be conducted at temperatures ranging from 0° C. to 100° C. Grain sizes after milling may range from 0.05 to 4 millimeters, and preferably from 0.1 to 1 mm. High temperature applications require finer grain sizes (i.e., less than 2 mm) for better heat transfer.

Upon establishment of the dry ingredient mixture, water 20 is added, thereby creating a slurry of the refractory 22. The water may be distilled, or derived from a municipal well, or from a hard water tap, or from a cistern. Preferably, whatever water source is utilized, the concentrations of calcium and or magnesium therein do not exceed 200 mg/liter. The slurry may be established on site by the user/applicator or other preparatory worker.

The resulting slurry comprises the refractory 22. The amount of water added is dependent upon maintaining a homogeneous mixture (similar to an emulsion) of the heretofore components listed above. The water is generally added in an amount 10-20 weight percent, preferably between 10-15 weight percent, and more preferably between 12-14 weight percent.

An exemplary convenient formulation process may occur in ambient temperature (e.g., room temperature, and generally between 13 and 24° C.), under ambient pressure, and in an ambient environment (e.g., air).

The amount of MKP in the resulting refractory 22 may range from 35-55 weight percent, preferably 40-50 weight percent.

The amount of metal oxide may range from 30-50 weight percent, and preferably 35-45 weight percent. A preferred oxide here is MgO inasmuch as it reacts more slowly and to a lesser extent with other substances under similar conditions. This is primarily due to the stronger ionic bond within the MgO crystal lattice, making it more stable and less prone to chemical reactions.

Tabular alumina may be present in a range from 10-20 weight percent, and preferably between 12-17 weight percent.

Example 1

An embodiment of the invention is a refractory having the following composition:

MKP present at approximately 45 weight percent;
Magnesium oxide present at approximately 40 weight percent;
Tabular Alumina present at approximately 15 weight percent; and
Water present at approximately 14 weight percent of the dry ingredients listed above.

Example 2

A second embodiment of the invention is a refractory having the following composition:

MKP present at approximately 52 weight percent;

Magnesium oxide present at approximately 35 weight percent;

Tabular Alumina present at approximately 13 weight percent; and

Water present at approximately 11 weight percent of the dry ingredients listed above.

Example 3

A third embodiment of the invention is a refractory having the following composition:

MKP present at approximately 42 weight percent;

Magnesium oxide present at approximately 41 weight percent;

Tabular Alumina present at approximately 17 weight percent; and

Water present at approximately 13 weight percent of the dry ingredients listed above.

The aforementioned preferred formulation confers temperature resistance of up to 1300 C, tensile strengths of up to 35 MPa, and thermal recycling of between 500 and 1000 cycles.

The setting time of this refractory varies with ambient temperature and the temperature of the water used. Generally, approximately 1.5 to 2 hours is average. After setting, the overlaid material may be put into service.

The preferred formulation is fire proof, and able to withstand direct flame impingement for at least 120 minutes. The formulation is also moisture proof.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all sub ratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A refractory comprising:
   a. MKP ranging from 35 to 55 weight percent;
   b. metal oxide ranging from 30 to 50 percent;
   c. alumina ranging from 10 to 20 weight percent; wherein the MKP, the metal oxide and the alumina are mixed to form a mixture, wherein the mixture contains no calcium and;
   d. water added to the mixture in an amount equal to 10 to 20 weight percent of the refractory to form a slurry.

2. The refractory as recited in claim 1 wherein the alumina is tubular alumina.

3. The refractory as recited in claim 1 wherein the metal oxide is a compound selected from the group consisting of magnesium oxide, iron oxide, zinc oxide, and combinations thereof.

4. The refractory as recited in claim 1 further comprising materials conferring flexibility to the refractory.

5. The refractory as recited in claim 2 wherein the refractory overlays a porous substrate to define a construct and the construct is capable of withstanding temperatures up to 1600° C.

6. The refractory as recited in claim 5 wherein the substrate has a porosity of between 5 and 25 percent.

7. The refractory as recited in claim 5 wherein the substrate has a pore size of between 10 and 30 microns.

8. The refractory as recited in claim 5 wherein the refractory is capable of withstanding temperatures up to approximately 1600° C.

* * * * *